Dec. 29, 1925.

R. A. B. VAN LYNDEN

GRADOMETER

Filed Nov. 22, 1923     7 Sheets-Sheet 1

INVENTOR.
Robert Aernout Baron van Lynden
BY Watson, Coit, Morse & Grindle
ATTYS.

Dec. 29, 1925.

R. A. B. VAN LYNDEN

GRADOMETER

Filed Nov. 22, 1923     7 Sheets-Sheet 2

1,567,347

Dec. 29, 1925.

R. A. B. VAN LYNDEN 1,567,347

GRADOMETER

Filed Nov. 22, 1923

INVENTOR
Robert Arnout
Baron van Lynden,
BY
Watson, Coit, Morse + Grindle.
ATTYS.

Dec. 29, 1925.   R. A. B. VAN LYNDEN   1,567,347
GRADOMETER
Filed Nov. 22, 1923   7 Sheets-Sheet 4

INVENTOR.
Robert Arnout
Baron van Lynden
By Watson, Coit, Moser & Grindle
ATTYS.

Dec 29, 1925.

R. A. B. VAN LYNDEN

1,567,347

GRADOMETER

Filed Nov. 22, 1923

INVENTOR
Robert Aernout
Baron van Lynden,
BY
Watson, Coit, Morse & Grindle,
ATTY'S Patented Dec. 29, 1925.

1,567,347

UNITED STATES PATENT OFFICE.

ROBERT AERNOUT BARON van LYNDEN, OF LONDON, ENGLAND.

GRADOMETER.

Application filed November 22, 1923. Serial No. 676,422.

*To all whom it may concern:*

Be it known that I, ROBERT AERNOUT BARON VAN LYNDEN, subject of the Queen of the Netherlands, and residing at London, in England, have invented certain new and useful Improvements in Gradometers, of which the following is a specification.

This invention relates to gradient meters, clinometers and the like more especially intended for use on aeroplanes, motor vehicles, submarines and for other like purposes and has for its object to enable correct readings of gradient or inclination to be obtained irrespective of the effects due to acceleration or deceleration in the speed of the vehicle or body on which the instrument is mounted.

In a gradient meter comprising a pendulum or similar gravity-actuated indicator a correct reading will be obtained so long as the instrument is stationary but if it is mounted on a moving body such as an aeroplane, a motor road vehicle or a submarine the readings obtained will only be substantially true while the speed of the vehicle remains constant. If the body is subject to acceleration or deceleration, there will be errors in the readings due to the inertia of the gravity-actuated member. The present invention enables correct readings to be obtained irrespective of the inertia effect of the pendulum or other member employed to give the primary indication of inclination.

A further object of the invention is to provide means whereby the actuating mechanism of a speedometer can be utilized to give the desired corrections.

Further objects of the invention will be apparent from the appended claims and from the description of the accompanying drawings which illustrate by way of example some preferred constructions according to the invention. In these drawings—

In the construction shown in Figures 1–4, a casing A is provided of suitable shape and dimensions having formed or fixed within it a transverse partition $A'$ placed at such a distance from the top of the casing as to divide it into two compartments B and C, the lower compartment C being larger than the upper compartment B. The top $A^2$ and the bottom $A^3$ of the casing A are respectively removable and when in place close the casing in a manner which, so far as the lower compartment C in the casing is concerned, is airtight or sealed so as to prevent liquid contained in the casing from escaping. In the front of the casing A are apertures $A^4$ with glass or like transparent panels $A^5$ through which readings can be taken of the gradients with the corrections applied, the speed at which the body is travelling and the distance travelled. The distance indicator is preferably disposed in the upper compartment B of the casing while the chamber C below the partition $A'$ contains the gradient meter, the mechanism for applying corrections thereto and that for actuating the speedometer.

Figure 1:
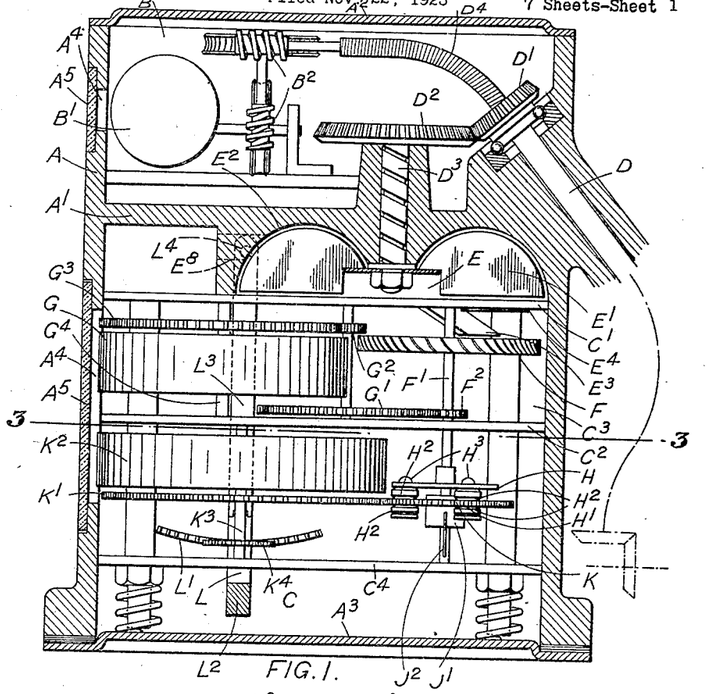
Figures 1 and 2 are vertical sections at right angles to one another through one construction.
Figure 2:
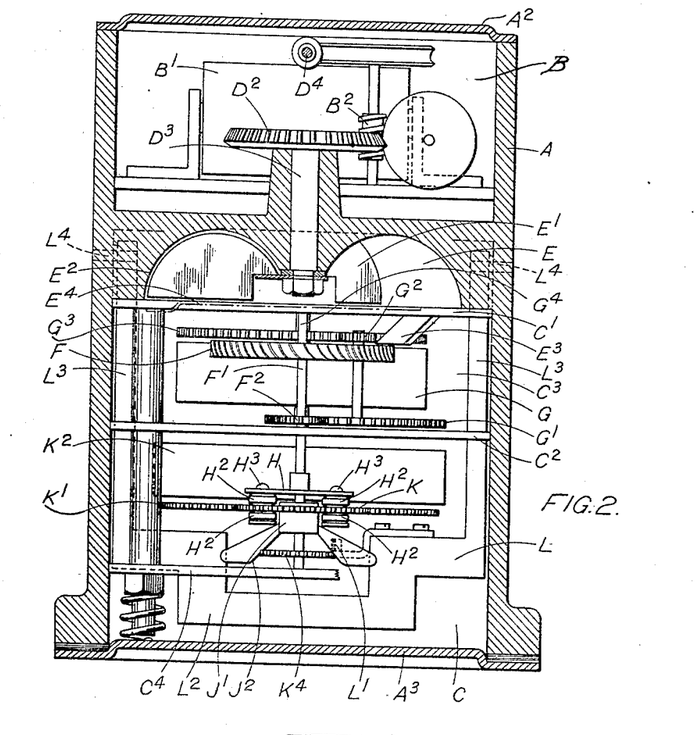
Figure 3:
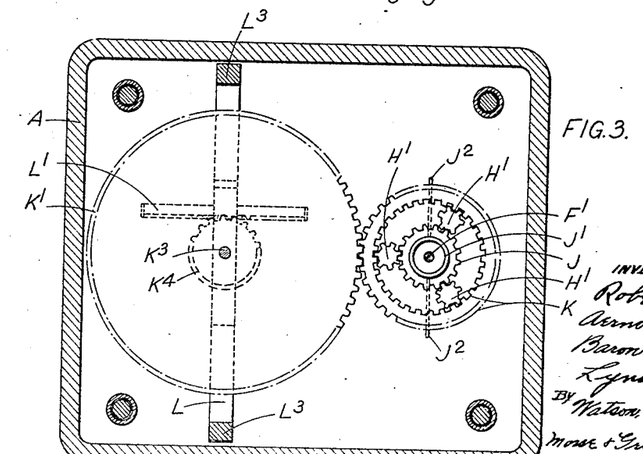
Figure 3 is a horizontal section on the line 3—3 of Figure 1.
Figure 4:
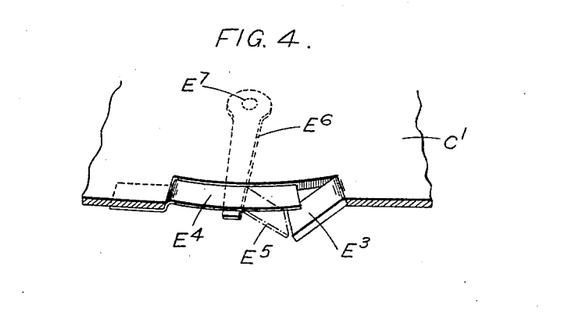
Figure 4 is an enlarged view of a portion of this construction.

A shaft D constantly driven by suitable means at a speed proportional to the speed of the body on which the instrument is mounted passes through the wall of the casing A and carries at its inner end a bevel or other gear wheel $D'$ meshing with a corresponding wheel $D^2$ mounted on a rotatable shaft $D^3$ which passes vertically downwards through the partition $A'$, the drive being thus transmitted from outside the casing A, first into the upper compartment B and thence through the partition $A'$ into the lower compartment C. On the lower end of the vertical driven shaft $D^3$ are mounted paddles $E'$ of suitable shape and dimensions which rotate in a correspondingly shaped chamber $E^2$ the whole forming a fluid impeller E which acts preferably on a liquid. The impeller chamber $E^2$ is closed on its under side by a partition $C'$ in which is an inclined delivery opening $E^3$ serving to direct the liquid stream from the impeller E on to a turbine F or the like carried on a vertically disposed shaft $F'$. In an opening in the bottom of the impeller chamber adjacent to the liquid delivery passage $E^3$ lies a flat spring $E^4$ fixed at one end while its free end projects into the side of the liquid delivery passage $E^3$. The arrangement of this spring is shown in Figure 4. The stream of liquid delivered by the impeller E acts on the end of this spring $E^4$ and as the force with which the stream is delivered increases, that is to say as the speed at which the impeller E is rotated increases, the spring $E^4$ will be deflected downwards as shown at $E^5$ in broken lines and will then obstruct to a greater or less extent the flow of liquid and thus vary automatically and in proportion to the variations in speed the rotational force acting on the turbine F. The flexibility of the spring $E^4$ is preferably adjustable the adjustment being effected, for example, by disposing beneath the spring a rigid member $E^6$ of suitable form which is pivoted at $E^7$ and can be adjusted about its pivot $E^7$ to move along the spring and thus to vary the effective length and the flexibility of the spring. Alternatively other devices operative to the same effect may be employed. The liquid delivered by the impeller E returns through suitable channels $E^8$ into the impeller chamber so that a constant circulation takes place.

On the vertical shaft $F'$ which carries the turbine F is a toothed pinion $F^2$ which through a suitable arrangement of gearing $G'$ $G^2$ $G^3$ transmits rotational movement to a drum G rotatably mounted on a fixed vertical spindle $G^4$ and enclosing a coiled spring one end of which is connected to the drum G while the other end is attached to the fixed spindle $G^4$ on which the drum rotates. This drum G constitutes the speedometer and carries on its surface markings indicating the speed, these markings being visible through one of the apertures $A^4$ in the casing. The liquid stream from the impeller E rotates the turbine F which in turn rotates the speedometer drum G against its spring; and this drum G, and therefore also the turbine F, assumes positions corresponding to the speed of the body on which the instrument is mounted. A second horizontal partition $C^2$ is disposed below that part $C^3$ of the lower chamber C which contains the turbine F and speedometer mechanism this subchamber $C^3$, which may be termed the speedometer chamber, thus lying immediately below the impeller chamber $E^2$.

The shaft $F'$ which carries the turbine member F passes through the second partition $C^2$ and has fixed on it a disc H carrying pinions $H'$ preferably three in number which are freely rotatable on studs $H^3$ carried by the turbine driven disc H. These pinions $H'$, which constitute the planet pinions of a differential gear of the epicyclic type, are equally spaced apart around the axis of the turbine shaft $F'$, and on the stud axle $H^3$ of each pinion $H'$ are mounted two rollers $H^2$ which lie respectively above and below the pinion, the rollers being of greater diameter than the pinion. The pinions $H'$ lie around and mesh with an externally toothed disc J constituting the internal element of the epicyclic differential gear. This disc J is carried on a tube $J'$ surrounding and rotatable freely on the shaft $F'$ which carries the turbine F, the disc being located and kept in position by the rollers $H^2$ which, as above described, lie above and below the planet pinions $H'$, the opposed faces of these rollers being suitably coned or otherwise shaped for this purpose. On the lower end of the tube $J'$, which carries the toothed disc, are mounted two or more vanes or paddles $J^2$ of suitable shape and dimensions. These paddles $J^2$ rotate in the air or in a suitable liquid and impose a constraining force on the inner member J of the differential gear, so that this member will not readily respond to any tendency to change its rotational speed. The paddles may be variously constructed to obtain the desired action, but preferably have some suitable degree of flexibility particularly towards their ends so as to lessen the resistance to rotation.

The outer member of the differential gear is constituted by a flat ring K which is toothed both internally and externally. The internal teeth mesh with the teeth of the planet pinions $H'$ while the external teeth engage a toothed wheel $K'$ carried by a drum $K^2$ mounted on a vertical spindle $K^3$. This drum $K^2$ is externally graduated with markings indicating gradients these markings together with those on the speedometer drum being read through the window $A^4$ in the side of the casing A containing the instrument. On the lower end of the spindle $K^3$ of the gradient meter drum $K^2$ is a pinion $K^4$ which gears with a toothed rack $L'$ carried by a pendulum member L. This pendulum L is conveniently of U-shape the centre portion $L^2$ lying across the bottom of the lower compartment C of the casing while the side members $L^3$ extend upwards adjacent to the opposite walls of the casing. The upper ends of the pendulum arms $L^3$ are suspended from pivots $L^4$ or the like disposed preferably in the walls of the casing just below the fixed partition $A'$ which divides the casing into the two main compartments B and C. The necessary clearances are allowed where the arms $L^3$ of the pendulum member pass the several partitions so that the pendulum L can swing freely within reasonable limits. The internally and externally toothed ring K constituting the external member of the differential gear floats and is kept in place by the rollers $H^2$ which are described above as being disposed above and below the planet pinions H′ of the gear.

The instrument operates in the following manner. The stream of fluid delivered by the impeller E acts on the turbine member F and causes this member to take up a rotational position corresponding to the force of the liquid stream acting on it, that is to say, the rotational position of the turbine member F is determined by the speed of the body on which the instrument is mounted. The spring within the speedometer drum G offers a substantially constant resistance to the rotation of the turbine member F, and hence the speedometer drum G will assume rotational positions corresponding to the speed and thus give readings of speed. So long as the turbine member F maintains a rotational position, that is to say, while the speed is constant, the positions of the planet pinions H′ about the axis of the differential gear will also remain constant and no movement will take place in the members of the gear if there is no gradient.

If the body is accelerated or decelerated but remains on the level or on a constant gradient, the turbine member F will rotate in accordance with the change of speed, and the speedometer drum G will also move to indicate this change of speed. The movement of the turbine member F will cause a corresponding rotation of the disc H carrying the planet pinions H′. At the same time, however, there will be a tendency for the pendulum L to swing in accordance with the change of speed. The force tending to move the pendulum will be transmitted through the gear wheels K⁴ and K′ to the outer member K of the differential gear. This force is opposed by the resistance force acting on the paddles J² of the inner member J of the differential gear as they rotate. The paddles J² are so constructed and arranged that this resistance force bears such relation to the force tending to move the pendulum that no motion of the outer member K takes place. The gradient meter drum K² and the pendulum L which are geared to this outer member K will therefore also remain stationary and no indication of a change of gradient will be given.

If the body experiences a change of gradient but still maintains the same constant speed, the pendulum L will swing into the new vertical position. The turbine member F will, however, remain unaffected, since there is no change of speed, and the planet pinions H′ will be held stationary. The pendulum will experience a resistance force from the paddles J², since the inner member J of the differential gear will rotate when the pendulum moves whilst the planet pinions H′ are held stationary, but this force will not prevent the pendulum L from swinging accurately into its vertical position, and the gradient meter drum K² will therefore rotate and give a correct indication of the new gradient.

If acceleration or deceleration of the body takes place at the same time as a change in gradient, the disc H carrying the planet pinions H′ will rotate with the turbine member F to an extent dependent only on the change in speed of the body, and the speedometer drum G will give a correct indication of the change in speed. The pendulum L, however, will tend to swing in one direction or the other under the simultaneous action of two forces, one due to the change in gradient, and the other due to the change in speed. The latter force will be counterbalanced by the resistance force acting on the paddles J² as they rotate exactly in the manner described for the case when a change in speed occurs without a change in gradient. The pendulum L will therefore swing to an extent corresponding only to the change in gradient, and the gradient meter drum will move correctly to indicate this change in gradient.

It will thus be seen that the resistance force acting on the paddles J² is utilized to counterbalance the force on the pendulum due to a change in speed of the moving body. Since the force acting on the pendulum when acceleration takes place is approximately a linear function of the acceleration, it is necessary, in order that this counterbalancing may be possible, that the resistance force (which for a rigid paddle may be taken to be approximately a quadratic function of the speed of the paddle and therefore also of the acceleration) should be adjusted to vary with the acceleration according to a law similar to that governing the force on the pendulum. This may be effected by making the paddles flexible towards their tips to the desired extent. Other means may also be employed to this end. The resistance force on the inner member J may be obtained in other ways than by employing paddles. Thus, for example, the tube J′ may carry a series of vanes, the edges of which lie near to inwardly projecting vanes or baffles carried by a fixed drum, the arrangement operating somewhat in the manner of a dash pot. Again this resistance force may be produced magnetically, if desired.

A further correction may also be desirable in some cases to compensate for the varying effect on the pendulum of a definite acceleration or deceleration at different gradients. This may be effected by making the exterior toothed edge of the outer member K eccentric with respect to the interior toothed edge, a corresponding eccentricity being given to the gear wheel K′ with which it engages. To enable this to be completely effective it is necessary to arrange the gearing so that neither the ring K nor the wheel K' has to rotate through more than 180° for the maximum gradient. This eccentric arrangement of the gears enables the leverage to be varied between the differential gear and the mechanism acting on the pendulum.

In place of employing eccentric gear wheels between the differential mechanism and the gradient meter drum as above described for the purpose of varying the leverage in the correcting mechanism, the same effect may be obtained in the following way. The toothed wheel K⁴, to which rotation is imparted from the differential mechanism and which acts on the rack L' carried by the pendulum L may be formed eccentric, this toothed rack having a convex face corresponding to the eccentricity of the wheel K⁴. In the normal position of rest of the pendulum with no inclination, the toothed periphery of the wheel K⁴ at the part which has the least radius will engage the centre portion of the length of the rack L', the radius of the wheel and consequently also the leverage exerted increasing as the pendulum swings from its zero position.

In order to ensure that the turbine F is acted upon by a force directly proportional to the speed of the moving body, it is necessary to control the fluid stream delivered from the impeller E through the orifice E³. This is effected by means of the spring E⁴. This spring E⁴, as has been stated, partially closes the delivery orifice E³ of the impeller E, and when the rotational speed of the impeller paddles E' increases, this spring is bent down slightly under the increased fluid pressure so as to obstruct the orifice E³ to a greater extent. By suitably adjusting the elasticity of this spring E⁴ the extent to which it bends at higher speeds may be so controlled, that the force exerted on the turbine F varies according to a straight line law with respect to the rotational speed of the impeller E. The adjustment of the spring E⁴ may be effected by means of a pivoted member E⁶ or in other ways. The control of the fluid stream delivered from the impeller E may also be effected by means other than a spring, if desired.

The upper compartment B of the casing A is conveniently employed to contain distance indicating or recording mechanism. This mechanism may be of any suitable known type, and may comprise an indicating drum B' actuated through worm gearing B² from an extension D⁴ of the driven shaft D, the readings being taken through one of the apertures A⁴ in the wall of the casing A.

In the lower part C of the casing A below the differential gear and gradient meter mechanisms it is convenient to arrange a third removable partition C⁴ formed so as not to interfere with the movements of the pendulum L. The whole of the lower compartment C of the casing may be filled with liquid on which the impeller E acts and by means of which the turbine member F is rotated. This liquid circulates, as mentioned, from the impeller chamber E² through the delivery orifice E³ on to the turbine F returning thence through the return channels E⁸ into the impeller chamber E². The liquid also serves to cooperate with the paddles J² or other resistance device associated with the differential gear so as to produce the resistance force required for effecting the corrections for the inertia errors of the pendulum L.

Figure 5:
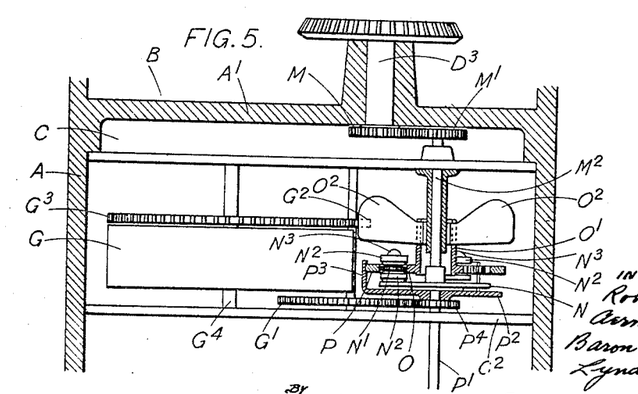
Figure 5 is a view similar to Figure 1 showing part of a second construction.

The second construction illustrated in Figure 5 is in many respects similar to that already described, like reference letters being employed where applicable. A casing A substantially as above described is conveniently employed with a fixed partition A' therein dividing the casing into upper and lower compartments B and C. The drive is transmitted as before through a shaft which passes through the wall of the casing into the upper compartment where it may actuate a distance-indicating mechanism. Thence the drive is transmitted in the same way as before by a short shaft D³ passing vertically through the partition A' in the casing. On the lower end of this shaft is a pinion M which meshes with a pinion M' on the upper end of a vertical shaft M² whose lower end carries a disc N. Projecting from one face of this disc are studs N³, conveniently three in number, on which rotate freely pinions N' constituting the planet pinions of a differential gear of the epicyclic type. These pinions N' are arranged as in the mechanism described above with freely rotating rollers N² above and below them. The pinions N' gear with an externally toothed disc O carried on a tube O' freely rotating on the driven shaft M² from which tube project vanes or paddles O² conveniently two in number. This toothed disc O constitutes the inner member of the differential gear. The outer member of the gear is constituted by a floating ring P which is internally toothed to engage with the planet pinions N'. This ring P as also the inner disc O is located and maintained in position in the axial direction by the rollers N² on each side of the planet pinions N'. Disposed coaxially with respect to the driven shaft M² on which is the planet pinion carrying disc N is a shaft P' on which is fixed a disc P² with arms or claws P³ projecting in the axial direction from its periphery and engaging the periphery of the toothed annulus P of the differential gear. In effect this constitutes a cage carried by the second vertical shaft P' the cage serving as a connection between this shaft and the toothed ring P so that the ring and the shaft will rotate together. The second shaft P' carries a pinion P⁴ by means of which rotation is communicated through suitable gearing G' G² G³ to a drum G marked externally with speedometer readings and mounted freely on a fixed vertical spindle G⁴. The drum G encloses a spring (not shown) one end of which is attached to the fixed spindle G⁴ while the other end is connected to the drum, so that rotation of the drum in one direction takes place against the action of the spring. The cage-carrying shaft P' is extended through a partition C² disposed beneath the differential gear and speedometer drum G and this shaft P' operates a second differential mechanism arranged in substantially the same way as in the mechanism of Figures 1–4. The shaft P' is therefore analogous to the shaft F' of the previous construction, and the mechanism illustrated in Figure 4 constitutes an alternative to the combination of fluid impeller and turbine used in that construction.

The paddles O² in this differential mechanism, as in that employed for applying the corrections for the inertia errors of the pendulum, must be made flexible towards their tips or must be otherwise so adjusted that the resistance force exerted on them is a linear function of the speed of rotation of the inner member O.

The operation of this device is as follows. The disc N carrying the planet pinions N' rotates at a speed directly proportional to the speed of the body on which the instrument is mounted. Owing to the action of the spring in the speedometer drum G, the outer member P of the differential gear is not free to rotate except through a limited angle. The inner member O of the gear does however rotate and its paddles O² experience a resistance force dependent upon its speed of rotation. This resistance force is opposed by the force of the spring in the speedometer drum G, and the outer member P of the gear therefore takes up such a position that these two forces exactly counterbalance one another. As has been stated above, the resistance force on the paddles O² is adjusted to be directly proportional to the speed of rotation of the member O and therefore also to the speed of the moving body, since the outer member P is stationary so long as no change in speed occurs and the pinions N' are rotated at a speed proportional to the speed of the body. The outer member P therefore takes up a position corresponding to the speed of the body and the speedometer drum gives correct speed indications. When the speed of the body changes, the rotational speed of the disc N also changes, and the inner member O tends to follow this change. But any change in the speed of the inner member O is accompanied by a corresponding change in the resistance force on the paddles O², and this disturbs the balance between the two forces, with the result that the outer member P moves until equilibrium is restored between the two forces, and carries with it the speedometer drum G. The outer member P consequently always takes up a position dependent on the speed of the moving body and only moves when acceleration or deceleration occurs. The motion of this member P is thus exactly analogous to the motion of the turbine in the construction of Figures 1–4, and its shaft P' will act in the same manner on the second differential gear to effect the necessary corrections for the inertia errors of the gradient meter.

It will be seen that by means of these constructions the juxtapositioning of a speedometer and a clinometer enables corrections to be effected in the latter instrument as the speedometer indicates acceleration or deceleration, and it becomes possible to utilize the mechanism actuating the speedometer to actuate also the mechanism which corrects automatically the errors in the gradient meter. This tends to simplicity and cheapness of construction.

In the constructions previously described the inertia errors of the pendulum have been corrected by means of an epicyclic differential gear. It will be apparent, however, that other types of differential gear, such for example as the bevel and pinion type, can be equally well employed. Again mechanisms of other types, which do not, strictly speaking, operate differentially, may be employed. Thus the differential mechanism may be replaced by a dash pot or slip device operating by fluid pressure.

Further, the pendulum has been described as positively connected through gearing to the gradient meter scale-drum and to the third element of the differential gear. Other arrangements may, however, be employed, in which the pendulum is independent of the third element of the differential gear. Thus for example, the pendulum may be geared to the scale-drum, whilst the differential gear element operates a pointer moving over the scale, or the gear element may be directly connected to the scale-drum whilst the pendulum operates a pointer moving over the scale. Yet a further arrangement consists of a fixed scale and two separate pointers operated respectively by the pendulum and by the gear element.

Some of the modifications referred to in the last two paragraphs are illustrated diagrammatically by way of example in Figures 6–10 of the drawings.

Figure 6:
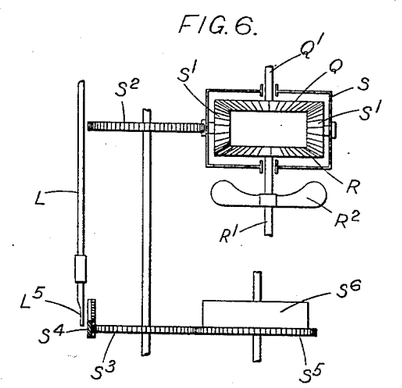
Figures 6–10 are diagrammatic views illustrating further constructions.

Figure 6 shows an arrangement employing differential mechanism of the bevel and pinion type to effect a corrective movement of the scale past which a pointer on the pendulum moves. In this figure the first bevel wheel Q of the differential mechanism is mounted on a shaft Q', which is operated by a member arranged to move in accordance with variations in the speed of the body on which the instrument is mounted, such for example as the turbine wheel F in the construction of Figures 1–3. The second bevel wheel R is mounted on a shaft R' carrying flexible paddles $R^2$, on which a resistance force is exerted when the bevel wheel R rotates. The cage S of the differential mechanism has rotatably mounted in it bevel pinions S' engaging with the two bevel wheels Q, R, and is toothed externally to engage with a gear wheel $S^2$ connected to another gear wheel $S^3$ controlling the scale $S^4$, past which a pointer $L^5$ on the pendulum L moves. The gear wheel $S^3$ meshes with a third gear wheel $S^5$ carrying a drum $S^6$ containing a spring.

This device operates in the following manner. So long as the speed of the body remains constant, all the elements of the differential gear remain stationary. When, however, acceleration or deceleration takes place the first bevel wheel Q rotates, and since the cage S is yieldingly held against rotation by means of the spring in the drum $S^6$, the second bevel wheel R also rotates. Owing to the resistance force which is thus set up by the paddles $R^2$, a differential action takes place which causes the cage S to rotate against the spring $S^6$ into such a position that the force of the spring counterbalances the resistance force on the paddles $R^2$. This results in a movement of the scale $S^4$ in accordance with the variation in speed of the moving body, the various elements in the mechanism being so adjusted that the movement of the scale $S^4$ exactly corresponds to the inertia movement of the pendulum L due to the acceleration or deceleration. The pendulum pointer $L^5$ and the scale $S^4$ will thus move together and no indication of a change in gradient will be given. As soon as the speed of the body again becomes constant, the cage S will return to its zero position, carrying with it the scale $S^4$. If however the gradient changes without a change in speed, the pendulum L will swing freely, so that its pointer $L^5$ moves over the scale $S^4$ which remains stationary. If the change in gradient is accompanied by a change in speed, the pendulum L will swing to an extent dependent both on the change in gradient and on the change in speed, whilst the scale $S^4$ will move to an extent dependent only on the change in speed. The pointer $L^5$ will thus move relative to the scale $S^4$ to give an accurate indication of the gradient.

This arrangement may be modified in various ways. Thus instead of moving the clinometer scale $S^4$ the cage S can be so arranged as to move a pointer over a fixed scale, thus indicating the corrections which must be made in the readings of the pendulum pointer over the same or another fixed scale. A differential mechanism of the type illustrated in this figure may also be utilized, after the manner of the construction shown in Figure 5, to replace the impeller E and turbine F of the construction of Figures 1–4, the bevel wheel Q then being continuously rotated at a speed directly proportional to the speed of the moving body. The resistance force on the second bevel wheel R may also be produced in other ways than by means of rotating paddles.

Figure 7:
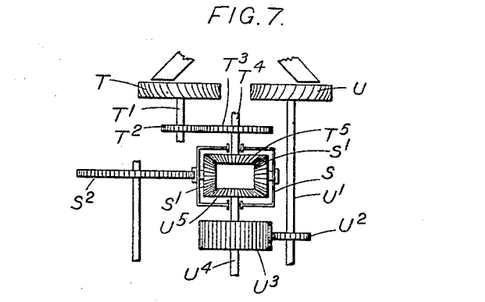

Figure 7 shows another arrangement in which an impeller or two separate impellers each rotated at a speed directly proportional to the speed of the moving body deliver fluid streams to two turbine wheels T U. The shaft T' of the turbine wheel T carries a pinion $T^2$ which meshes with a light gear wheel $T^3$ mounted on the shaft $T^4$ of the first bevel wheel $T^5$ of a differential gear. The shaft U' of the second turbine wheel U drives either directly or through gearing a pinion $U^2$ meshing with a heavy gear wheel $U^3$ which is mounted on the shaft $U^4$ of the second bevel wheel $U^5$ of the differential gear. The cage S of the differential gear, which is arranged in the manner shown in Figure 6, has rotatably mounted in it bevel pinions S' meshing with the two bevel wheels $T^5$ and $U^5$, and is yieldingly held against rotation by means of a spring (not shown), the motion of the cage S being utilized to move the clinometer scale or an indicating pointer moving over a fixed clinometer scale.

In operation this device is so arranged that the two bevel wheels $T^5$ $U^5$ rotate at the same speed so long as the speed of the moving body remains constant. When however acceleration or deceleration takes place, different effects will be produced on the two bevel wheels owing to the difference in mass between the wheels $T^3$ and $U^3$. This will produce a differential movement of the cage S against the action of its controlling spring, the various elements of the mechanism being so adjusted that this movement of the cage can be employed to apply or to indicate the necessary corrections for the inertia errors of the pendulum. When the speed again becomes constant the cage S will return to its zero position.

It will be appreciated that this construction can be simplified by employing a single turbine wheel T, the speed of the heavy wheel $U^3$ being regulated entirely by means of the spring controlling the cage S. Again instead of controlling the cage S by means of a spring, the cage may be connected through gearing to the pendulum itself after the manner of the construction shown in Figures 1–4.

It will also be noticed that this construction operates in a manner different from that of the constructions previously described. In the present construction the forces employed for correcting the inertia errors of the pendulum are derived from the inertia of members moving at speeds proportional to the speed of the moving body, whilst in the previous constructions these forces are derived solely from members which are moved in accordance with the acceleration or deceleration of the moving body.

Figure 8:
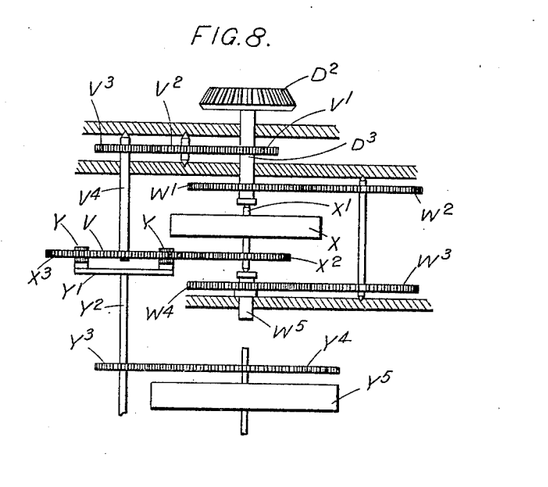

Another construction also operating on this inertia principle is illustrated in Figure 8. In this case the shaft $D^3$ of the bevel wheel $D^2$, which is driven at a speed proportional to that of the moving body in exactly the same manner as in the construction of Figures 1-4, carries two gear wheels $V'$ $W'$. The gear wheel $V'$ drives through gear wheels $V^2$ $V^3$ a shaft $V^4$ on which is mounted the inner member $V$ of an epicyclic differential gear. The wheel $W'$ is connected through gearing $W^2$ $W^3$ to another gear wheel $W^4$ mounted on a shaft $W^5$ which is coaxial with the shaft $D^3$. These gear wheels $W'$ and $W^4$ are so arranged as to rotate at the same speed and in the same direction, and the ends of the shafts $D^3$ and $W^5$ are so formed as to act as bearings for a short spindle $X'$ carrying a flywheel $X$. This spindle $X'$ also carries a pinion $X^2$ meshing with external teeth on the annular outer member $X^3$ of the differential gear. The third member of the differential gear is constituted by the planet pinions $Y$, (preferably three in number) which may if desired be provided with rollers serving to support the inner and outer members of the gear in the manner described with reference to the construction of Figures 1 to 4. These pinions $Y$ are rotatably carried on a disc $Y'$ which is mounted on a shaft $Y^2$. The shaft $Y^2$ carries a gear wheel $Y^3$ meshing with another gear wheel $Y^4$ rigidly connected to a drum $Y^5$ carrying the gradient meter scale. This drum $Y^5$ may be geared to the pendulum as in the construction of Figures 1-4 or alternatively may be spring-controlled, the pendulum being provided with a pointer moving over the scale as in the construction of Figure 6.

This construction operates in the following manner. So long as the speed and inclination of the moving body remain constant the inner and outer members $V$ and $X^3$ of the differential gear rotate at such speeds that the disc $Y'$ carrying the pinions $Y$ remains stationary. When however, acceleration or deceleration takes place, without a change in gradient, the inner member $V$ of the differential gear will be correspondingly accelerated or decelerated, but owing to its inertia the flywheel $X$ will tend to resist any change in speed and will therefore exert a force tending to rotate the disc $Y'$ carrying the pinions $Y$. If the drum $Y^5$ is spring-controlled, the disc $Y'$ will rotate until the force due to the inertia of the flywheel $X$ is balanced by the force of the controlling spring. This will cause the scale-carrying drum $Y^5$ to rotate to an extent dependent upon the acceleration or deceleration of the moving body, the gearing being so chosen that this movement of the scale corresponds exactly to the movement of the pendulum and its pointer due to the variation in speed of the body. If on the other hand the drum $Y^5$ is not spring-controlled but is geared to the pendulum itself as in Figures 1-4, the pendulum (as a result of the acceleration or deceleration of the moving body) will also exert a force tending to rotate the disc $Y'$. The masses of the pendulum and of the flywheel $X$ are in this case so chosen that the two forces thus exerted on the disc $Y$ will neutralize one another, so that the disc $Y$ and therefore also the scale-carrying drum $Y^5$ will remain stationary and no indication of a change in gradient will be made. When a change in gradient takes place without a change in speed, the pendulum will swing into its new vertical position and will give the desired gradient indication. If the change in gradient is accompanied by a change in speed, the inertia of the flywheel $X$ will act either to neutralize the motion of the pendulum due to the change in speed so that the pendulum moves only according to the change in gradient, or to move the gradient meter scale to an extent corresponding to the excess movement of the pendulum so that a correct gradient reading is given, according as the scale-carrying drum $Y^5$ is geared to the pendulum or is spring-controlled and independent of the pendulum.

The various gear wheels in this construction are so proportioned that the fly wheel $X$ rotates at the same speed as the ends of the shafts $D^3$ and $W^5$ which act as bearings for the flywheel spindle $X'$. This eliminates friction at the bearings of the spindle and as a result only a small force is required to speed up the flywheel when necessary. There will, however, be a certain amount of friction between the teeth of the members of the differential gear, but the effect of this friction can be neutralized, if desired, by so arranging the gearing that the shafts $D^3$ and $W^5$ normally rotate at a speed slightly greater than that of the flywheel $X$ and its spindle $X'$, so that a constant speed of the flywheel can be maintained without the application of any external force. A speedometer can also be driven if desired, from any of the gear wheels $V'$ $V^2$ $V^3$ $W'$ $W^2$ $W^3$ $W^4$ or independently. It will be noticed that this construction eliminates all fluid resistance devices, such as the impeller and turbine or the rotating vanes of the previous constructions, and thus removes the difficulty associated with such devices of converting the resistance forces to follow a straight line law. It also becomes unnecessary to provide a damping medium for the pendulum in the case when the pendulum is geared to the drum $Y^5$, since the inertia of the flywheel X is sufficient for this purpose.

Figure 9:
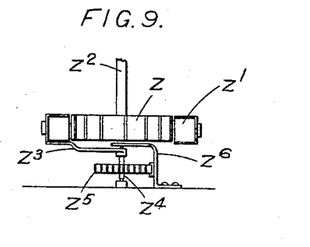
Figure 10:
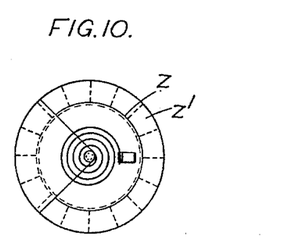

A further modification is shown in Figures 9 and 10. In this case the desired differential effect is obtained by means of a fluid slip device operating after the manner of a dash pot. This device essentially consists of a member Z provided with outwardly directed vanes or pockets rotating within an annular member Z′ having inwardly directed baffle vanes or pockets. The inner member Z is mounted on a shaft $Z^2$ operated by a spring-controlled turbine wheel or other member so arranged as to move when acceleration or deceleration occurs, its position thus being a measure of the speed of the moving body. The outer member Z′ (which is shown in bottom plan in Figure 10, the inner member Z being shown in broken line) is carried by a bracket $Z^3$ fixed to a pivot pin $Z^4$ controlled by a coiled spring $Z^5$ which is held at its outer end by a fixed bracket $Z^6$. When the speed of the body remains constant, no motion occurs between the two members Z and Z′. When however, a change in speed takes place, the inner member Z rotates in accordance with the acceleration or deceleration. The vanes on the two members are so arranged that there will be initially a fluid loss between the two members, and the outer member Z′ will thus be forced to move with the inner member until the fluid pressure is balanced by the force of the controlling spring $Z^5$. As soon as the speed again becomes constant, the inner member Z will come to rest, and the outer member Z′ will be returned to its zero position by the spring $Z^5$, fluid slip occurring between the vanes. The motion of the outer member Z′ is utilized to move the scale over which the pendulum pointer swings or to move a second indicating pointer over a fixed scale. In some cases it may be possible to utilize the member Z′ as the scale itself, suitable graduations being provided on its outer surface. The spaces between the vanes may be filled with air or with liquid, but in the latter case it is desirable to fill the whole casing with liquid or otherwise so to arrange the immersed area of the vanes that inclination of the whole instrument will not interfere with the action of the device. By suitably choosing the amount of liquid introduced into the casing, it may be possible to utilize the centrifugal action on the liquid to regulate the fluid pressure on the vanes so that it varies according to a straight line law, but this regulation may also be effected in other ways.

Figure 11:
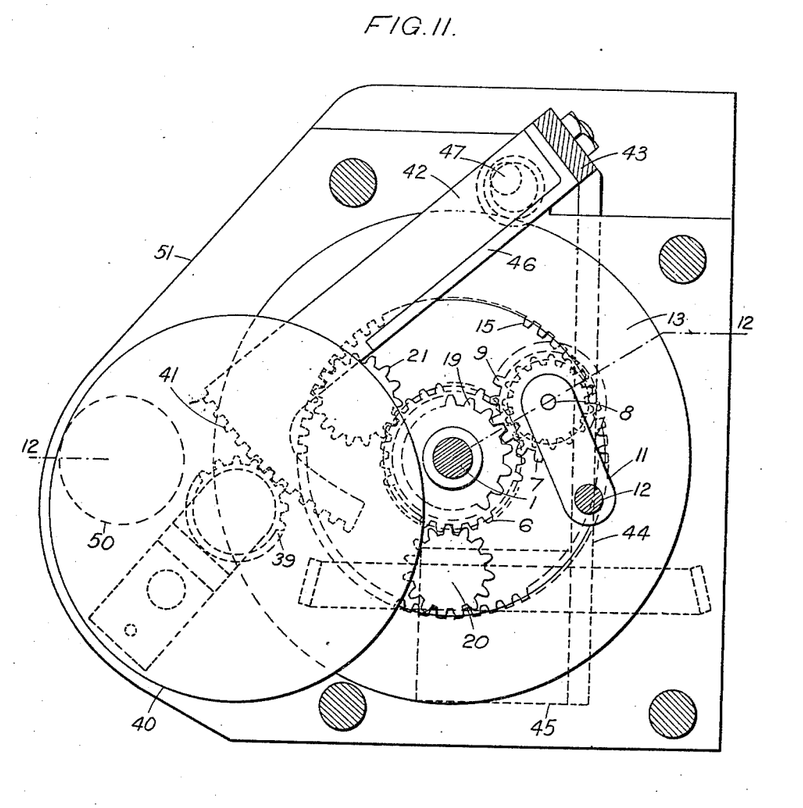
Figure 11 is a sectional elevation of yet another construction embodying the invention the figure showing in effect a side view of the apparatus with one side plate of the casing removed.
Figure 12:
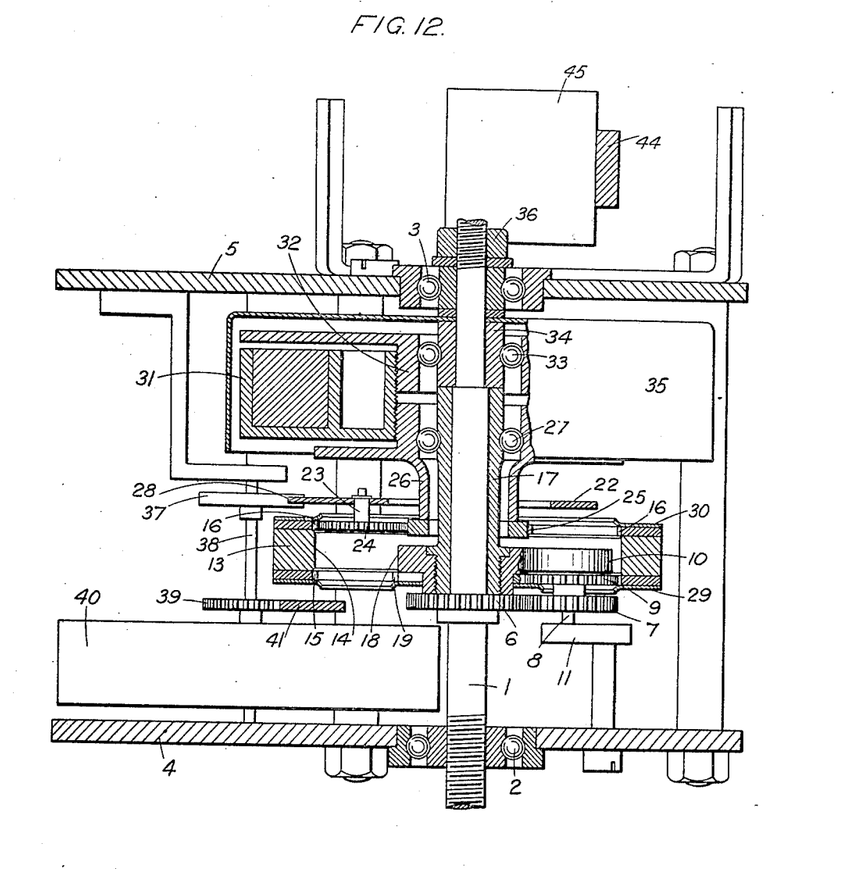
Figure 12 is a sectional plan on the broken line 12—12 in Figure 11.
Figure 13:
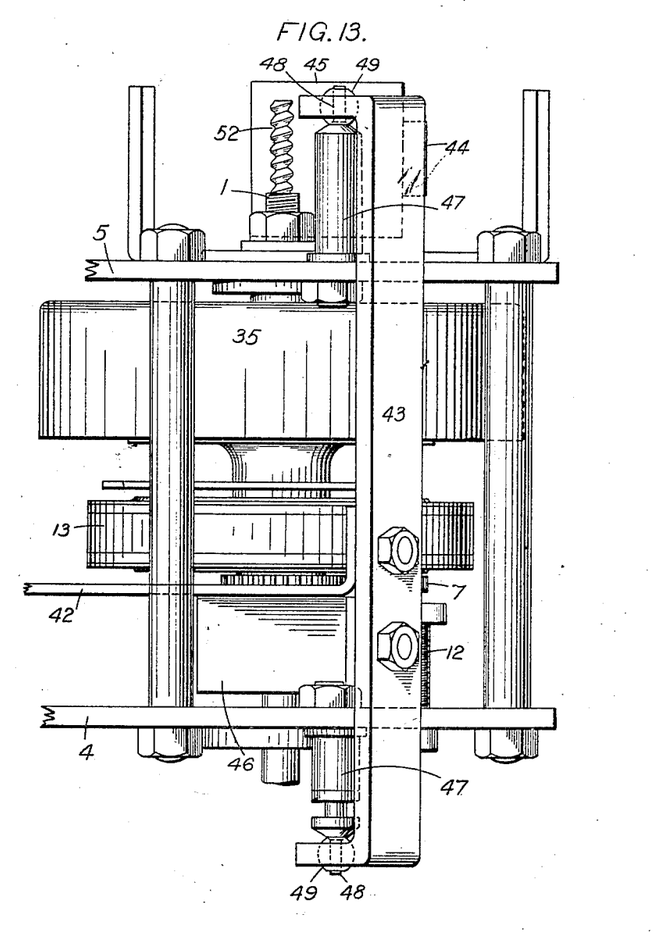
Figure 13 is a plan of a portion of the mechanism shown in Figure 11.

Referring to the construction illustrated in Figures 11, 12 and 13, a shaft 1 is rotated at a speed proportional to the speed of the body on which the instrument is mounted, this shaft being carried on ball bearings 2 and 3 in the side plates 4 and 5 of the casing which encloses the instrument. On the shaft 1 is fixed a toothed wheel 6 which meshes with a toothed wheel 7 carried on a spindle 8 the latter also carrying a toothed wheel 9 and a roller 10. The toothed wheels 7 and 9 together with the roller 10 are fixed on the spindle 8 or connected together so that they will rotate together. The spindle 8 is carried on one end of an arm 11 the other end of which is mounted on a stud 12 which passes through the side plate 4 of the casing, the head of the stud lying outside this casing. By means of this stud the arm 11 can be swung and thereby it is possible to exactly locate the spindle 8 with the toothed wheels and roller thereon relatively to the parts with which these wheels and roller engage.

A floating annulus 13 is provided internally with a smooth track 14 and on either side of it internally toothed portions 15 and 16. Freely rotatable on the spindle 1 is a sleeve 17 one end of this sleeve butting up against a face of the toothed wheel 6 and this end portion of the sleeve 17 carrying a smooth track 18 and an externally toothed ring 19. The toothed wheel 9 meshes on the one hand with the external teeth 19 on the sleeve 17 and on the other hand with the internally toothed ring 15 carried by the annulus 13. The roller 10 bears on the one hand on the smooth surface 18 carried by the sleeve 17 and on the other hand on the internal smooth surface 14 of the annulus 13. Two other toothed wheels 20 and 21 similar to the toothed wheel 9 and all equally spaced apart about the axis of the spindle 1 mesh like the toothed wheel 9 with the toothed wheel 19 and the internally toothed ring 15. The toothed wheels 20 and 21 also carry rollers similar to the roller 10 which like that roller bear on the smooth surfaces 18 and 14. Thus as the spindle 1 rotates, it will cause rotation of the toothed wheels 7 and 9 and the annulus 13 and sleeve 17 will be rotated in opposite directions the sleeve turning in the same direction as the spindle 1 but at a speed slightly less than that of the spindle. The roller 10 together with the two rollers carried by the toothed wheels 20 and 21 serve to keep the annulus 13 properly centered.

On what may be termed the inner side of the annulus 13, that is, the side remote from the toothed wheel 6 on the spindle 1, is a floating cage or frame 22 which carries three spindles 23 on each of which is a toothed wheel 24 these three toothed wheels meshing on the one hand with the internally toothed ring 16 carried by the annulus 13 and on the other hand with a toothed wheel 25 mounted on a sleeve 26 which surrounds but is well clear of the sleeve 17, balls 27 being interposed between these sleeves. Part of the periphery of the cage or frame 22 is provided with teeth as at 28. Side plates 29 and 30 suitably formed and attached to the annulus 13 serve to keep the two sets of planet wheels in place within the annulus 13.

A weighted wheel constituting an inertia member 31 is carried partially by a portion of the sleeve 26 which constitutes the external part of the race for the balls 27 and partially by a sleeve 32 which similarly forms the external race for a set of balls 33 the internal race of this bearing being constituted by a sleeve 34 carried on the spindle 1. The weight of the wheel 31 is thus distributed equally between the two bearings 27 and 33. A cap or casing 35 encloses the wheel 31 and serves to reduce air friction with respect to the wheel 31 the cap being carried by and rotating with the spindle 1 and thus rotating at a speed slightly faster than the speed of the wheel. The parts are locked in place on or around the spindle 1 by a nut 36.

The teeth 28 on the edge of the frame or casing 22 mesh with a toothed wheel 37 fixed on a spindle 38 which also carries fixed thereto a toothed wheel 39 and drum 40 which carries the indications of gradient in such a way that they can be read at a window in the casing of the instrument as the drum 40 is turned. The toothed wheel 39 gears with a toothed sector 41 carried on an arm 42 which is fixed to and projects from a bar 43 on which hangs the arm 44 of the pendulum, a weight 45 being suitably mounted on the lower end of this arm 44. The sector arm 42 is conveniently strengthened by a lateral web 46.

It will be seen that the mechanism thus comprises in effect two differential mechanisms, one between the sleeve 17 and the annulus 13, and the other between this annulus and the inertia wheel 31 the planet wheels of the first differential being rotated from the spindle 1. The mechanism operates in the following manner. Any movement of the pendulum 44, 45 will result in rotation of the indicating drum 40 this indication being unaffected by the rotating parts so long as the rotational speed of the spindle 1 remains constant. If, however, acceleration or deceleration of the spindle 1 takes place the corresponding constraining force given to the inertia of the wheel 31 will be applied through the planet members 24 of the second differential mechanism and the frame 22 to the pendulum and the necessary correction will be effected in the rotational position of the indicating drum 40.

The gear ratios are preferably chosen so that the speed of rotation of the wheel 31 will be less than the speed of rotation of the spindle 1 but greater than the rotational speed of the sleeve 17 the difference between the rotational speed of the wheel and the spindle being preferably substantially the same as the difference between the rotational speed of the wheel and the sleeve 17. As a result the retarding force exerted through one of the bearings 27 and 33 on the wheel 31 is compensated by the accelerating force of the other of these bearings if the weight of the inertia wheel is equally distributed between these two ball bearings.

As indicated, the spindle 1 is conveniently disposed horizontally but it may be arranged vertically if desired the details of the mechanism being correspondingly varied.

Figure 13 illustrates a convenient construction for the mounting of the bar 43 which carries the pendulum 44, 45. The pivotal supports 47 of this bar are conveniently mounted eccentrically as appears in Figure 11 so as to allow of an accurate adjustment of the toothed sector 41, 42 relative to the wheel 39 with which this sector meshes. To obviate strain on these bearings the pivot pins 48 conveniently rest in balls 49.

The mileage counter may conveniently be disposed as indicated diagrammatically at 50 (Figure 11) being read through a transparent opening in the front 51 of the casing. A worm 52 on the end of the spindle 1 serves to actuate this counter. On the other side of the casing, that is, beyond the side plate 4 a speedometer mechanism may be disposed driven from the shaft 1 the indicating drum of the speedometer being conveniently arranged so that it will lie to one side of the gradient indicator drum 40.

In order to simplify the mechanism and obviate certain frictional and other effects resulting from the use of certain of the gearing, the construction shown in Figures 11, 12 and 13 may be modified by suspending the pendulum so that the axis about which it swings is coincident with the axis of the spindle 1. In that case the action of the inertia wheel on the pendulum may be communicated by a direct connection between the frame 22 and the pendulum.

The details of construction may be modified as found convenient and desirable in accordance with the purpose for which the instrument is to be used, that is to say, whether it is to be employed on a motor road vehicle or on aircraft or on a submarine.

What I claim as my invention and desire to secure by Letters Patent is:—

1. In a gradient meter mounted on a moving body, the combination of a gravity-actuated gradient indicator, a member adapted to be rotated at a speed proportional to that of the moving body, and means for causing the rotation of said member to give corrections for errors due to the inertia of the gravity-actuated indicator.

2. In a gradient meter mounted on a moving body, the combination of a gravity-actuated gradient indicator, a member adapted to be rotated at a speed proportional to that of the moving body, a second member responsive to variations in the speed of rotation of said first member, and means for causing the movement of said second member to give corrections for errors due to the inertia of said gravity-actuated indicator.

3. In a gradient meter mounted on a moving body, the combination of a gravity-actuated gradient indicator, a member adapted to be rotated at a speed proportional to that of the moving body, and means for causing the rotation of said member to apply automatically to the gravity-actuated indicator corrections for errors due to the inertia of said indicator.

4. In a gradient meter mounted on a moving body, the combination of a gravity-actuated gradient indicator, a member adapted to be rotated at a speed proportional to that of the moving body, a second member responsive to variations in the speed of rotation of said first member, constraining means adapted to prevent said second member from responding readily to said speed variations, and differential means for causing the movement of said second member to apply automatically corrections for errors due to the inertia of the gravity-actuated indicator.

5. In a gradient meter mounted on a moving body, the combination of a gravity-actuated gradient indicator, a member adapted to be rotated at a speed proportional to that of the moving body, a second member responsive to variations in the speed of rotation of said first member and having sufficiently great inertia to prevent it from responding readily to said variations, and means operating differentially with respect to these members for causing the force derived from the inertia of said second member to give corrections for the inertia errors of the gravity actuated indicator.

6. In a gradient meter mounted on a moving body, the combination of a gravity-actuated gradient indicator, means for correcting the inertia errors thereof automatically, an instrument for indicating the speed at which the body is moving, a member adapted to be rotated at a speed directly proportional to the speed at which the body is moving, and means for causing the rotation of said member to operate both the speed indicating instrument and the means for correcting the errors of the gradient meter.

7. In a gradient meter mounted on a moving body, the combination of a gravity-actuated gradient indicator, a member adapted to be rotated at a speed proportional to that of the moving body, a second member adapted to be moved in accordance with the acceleration and deceleration of the body and whose position is a measure of the speed of the body, differential means for causing the motion of the first member to actuate the second member, means for exerting a constraining force upon said second member, a third member adapted to be operated so that its position is a measure of the acceleration or deceleration of the moving body, means for causing the motion of the second member to actuate the third member, means for exerting a constraining force upon said third member, and means for utilizing the movement of the third member to give corrections for the inertia errors of the gravity-actuated indicator.

8. In a gradient meter mounted on a moving body, the combination of a gravity-actuated gradient indicator, a member adapted to be rotated at a speed proportional to that of the moving body, and a differential mechanism comprising three elements operatively connected together, means for causing the rotation of said member to move the first element of the differential mechanism to an extent proportional to the speed of the moving body, means for exerting a constraining force on the second element whereby said second element will not respond readily to movements of the first element, and means for causing the differential movement of the third element to give corrections for errors due to the inertia of the gravity-actuated indicator.

9. In a gradient meter mounted on a moving body, the combination of a gravity-actuated gradient indicator, a rotatable member, means for exerting a force on said member proportional to the speed of the moving body, whereby said rotatable member will be moved in accordance with the acceleration or deceleration of the moving body, a second member adapted to be displaced by the movement of said rotatable member, means for exerting a constraining force upon said second member, means for causing the displacement of said second member to give corrections for errors due to the inertia of the gravity-actuated indicator, and means for causing said second member to return to its zero position under the action of its constraining force when said first member again comes to rest.

10. In a gradient meter mounted on a moving body the combination of a gravity-actuated gradient indicator, a member adapted to be rotated at a speed proportional to that of the moving body, a differential mechanism to the planet pinions of which rotary motion is imparted by the said rotating member, a second differential mechanism one element of which is common to both differential mechanisms, a rotatable inertia member actuated by one element of the second differential mechanism, and an operative connection between the planet wheels of the second differential mechanism and the gravity-actuated indicator for causing the action of the rotatable inertia member to apply corrections for errors due to the inertia of the gravity-actuated indicator.

11. In a gradient meter mounted on a moving body, the combination of a gravity-actuated gradient indicator, a member adapted to be rotated at a speed proportional to that of the moving body, a second member responsive to variations in the speed of rotation of said first member, constraining means adapted to prevent said second member from responding readily to said speed variations, and means for causing the movement of said second member to give corrections for errors due to the inertia of said gravity-actuated indicator.

In testimony whereof I have signed my name to this specification.

ROBERT AERNOUT BARON van LYNDEN.